March 1, 1966 S. H. CAMERON 3,238,522

MAGNETIC ANALOG TO DIGITAL CONVERTER

Filed Dec. 22, 1960 2 Sheets-Sheet 1

INVENTOR.
Scott H. Cameron

BY Hill, Sherman, Meroni, Gross & Simpson

ATTORNEYS

MAGNETIC ANALOG TO DIGITAL CONVERTER

Filed Dec. 22, 1960 2 Sheets-Sheet 2

INVENTOR.
Scott H. Cameron
BY
Hill, Sherman, Meroni, Gross & Simpson
ATTORNEYS

United States Patent Office 3,238,522
Patented Mar. 1, 1966

3,238,522

MAGNETIC ANALOG TO DIGITAL CONVERTER

Scott H. Cameron, Northfield, Ill., assignor to IIT Research Institute, a corporation of Illinois Filed Dec. 22, 1960, Ser. No. 77,736
10 Claims. (Cl. 340—347)

This invention relates to an analog to digital converter system and method and particularly to such a system capable of generating a pulse output signal wherein the output is in code form.

In accordance with the present invention, a series of magnetic cores are provided which in general have more than one output winding to provide respective series of output windings associated with the cores and corresponding to different code positions. Certain cores are desaturated depending upon the value of the input signal and the non-saturated cores are identified by virtue of the number and positions of the output windings associated therewith.

It is therefore an important object of the present invention to provide an analog to digital converter system and method having great simplicity and economy and which will convert an input analog signal to an output signal in code form.

It is another object of the present invention to provide a highly compact and efficient core structure and arrangement for an analog to digital converter system.

Other objects, features and advantages of the present invention will be apparent from the following detailed description taken in connection with the accompanying drawings, in which.

As shown on the drawings.

Figures 1, 2, 4:
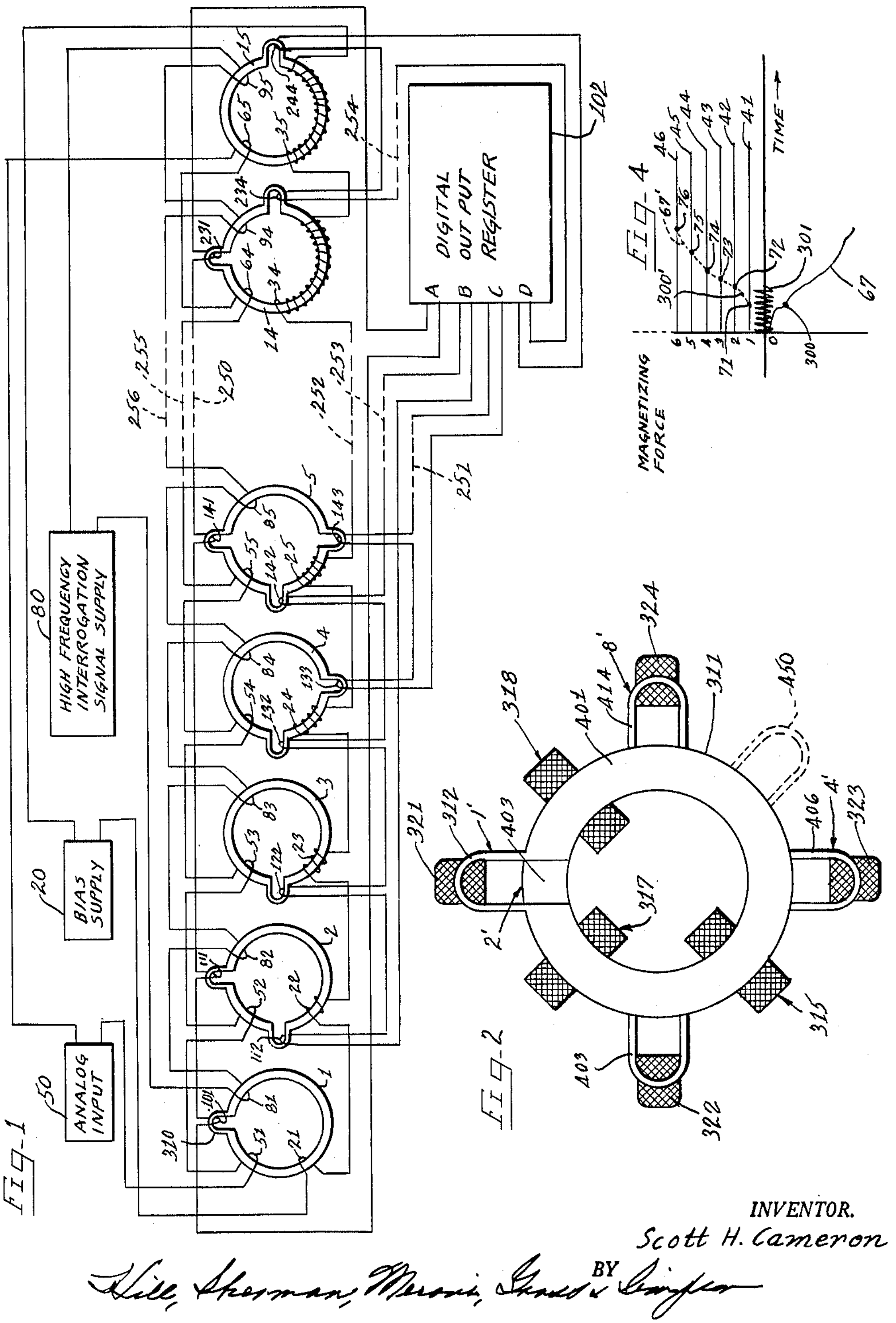
FIGURE 1 is a fragmentary diagrammatic view of a magnetic analog to digital converter system in accordance with the present invention.
FIGURE 2 is an enlarged plan view of the system of FIGURE 1 but with the cores arranged in axially aligned stacked relation.
FIGURE 4 is a diagrammatic illustration of the principle of operation of the system of FIGURES 1–3.

FIGURE 1 illustrates a series of magnetic cores 1–5, 14 and 15 of a series of fifteen cores. The sixth through thirteenth cores have been omitted from FIGURE 1 in order to show the remaining cores on a larger scale. For convenience in this description, the omitted cores and associated parts will be assigned numbers in parenthesis, e.g. cores (6) through (13), and the series of cores and associated parts will be designated as a whole by continuous sequences of numbers, the cores thus being designated as cores 1–15.

A bias supply 20 delivers a direct bias current to a series of fifteen windings 21–25, (26)–(33), 34 and 35 having progressively greater numbers of turns linking the successive cores. For diagrammatic purposes, the windings 21–25 have 1, 2, 3, 4 and 5 turns and windings 34 and 35 have 14 and 15 turns, respectively. The windings (26) through (33) would have 6, 7, 8, 9, 10, 11, 12 and 13 turns, respectively. In the absence of other magnetizing forces, the bias current from supply 20 preferably is sufficient to saturate each of cores 1–15.

Referring to FIGURE 4, the magnetic condition of each of cores 1–15 resulting from the bias current from supply 20 may be represented by fifteen horizontal lines such as 41–46, where FIGURE 4 is a plot of magnetizing force as a function of time. Lines 41–46 thus represent the bias magnetization applied to cores 1–5 and (6), respectively. If the magnetizing force applied to core 1 by winding 21 is assigned an arbitrary value of 1, it will be understood that the saturation magnetizing force for the material of core 1 at least at the regions of the output windings is less than such value. If the successive windings 21–35 on the successive cores 1–15 receive equal bias currents and have numbers of turns equal to successive multiples of a given number of turns (i.e. $n$, $2n$, $3n$, $4n$ . . . $15n$ where $n$ is the number of turns linking core 1), the successive lines 41–46, etc. in FIGURE 4 will be uniformly spaced. Of course, many other arrangements for applying graded magnetizing forces to a series of cores may be conceived depending on the characteristics of the converter system desired. For example, permanent magnet biasing of the successive cores may be employed.

If an analog input current from a source 50 is supplied to windings 51–65 in series as indicated to provide a magnetizing force variation with time as indicated by curve 67 in FIGURE 4, it will be observed that cores 1–5 and (6) will be switched out of saturation condition at successive instants of time corresponding to points 71–76 on curve 67'. Curve 67' is identical to curve 67 except for the sign of the magnetizing force values, so that points 71–76 represent the instants of time when the algebraic sums of the input magnetizing force (represented by curve 67) and the bias magnetizing forces in cores 1–5 and (6), (represented by curves 41–46) are equal to zero.

If a high frequency interrogation current is supplied from component 80 in FIGURE 1 to windings 81–95 in series as represented by waveform 301 in FIGURE 4, at the instant of time represented by point 71 in FIGURE 4, an output voltage will be induced in winding 101 linking reduced cross section portion 310 of core 1. This signal would be supplied to the A input of digital output register 102, and the presence of a signal in the A position thus indicates that the analog signal has a value to desaturate core 1 at the given instant of time. At a succeeding instant of time corresponding to point 72 in FIGURE 4, windings 111 and 112 of core 2 would be energized while portion 310 of core 1 would be saturated to substantially eliminate an induced voltage in winding 101. Winding 111 of core 2 is coupled to the A input of digital output register 102 while winding 112 is coupled to the B input of the register 102. Thus the presence of a signal in both the A and B positions of the register indicates that the analog input signal has an instantaneous value equal in magnitude and of opposite polarity to the bias magnetization of core 2. Core 3 has an output winding 122 coupled to the B input of register 102; core 4 has output windings 132 and 133 coupled to input positions B and C of register 102; core 5 has output windings 141, 142 and 143 coupled to the A, B and C inputs of register 102, respectively; core 14 has output windings 231 and 234 coupled to the A and D inputs of register 102; and core 15 has a winding 244 coupled to the D input of register 102.

Assigning numbers (6)–(13) to the cores not shown in FIGURE 1, numbers (26)–(33) to the corresponding graded windings, and numbers (151), (153); (163); (173), (174); (181), (183), (184); (191)–(194); (202)–(204); (212), (214); and (221), (222) and (224) to the output windings associated with these cores, the parameters of the system of FIGURE 1 may be tabulated as follows:

TABLE I

*Winding arrangement for embodiment of FIGURE 1*

| Core ref. No. | Graded winding | | Output winding | | | |
|---|---|---|---|---|---|---|
| | Ref. No. | Relative number of turns | D | C | B | A |
| 1 | 21 | 1 | ------ | ------ | ------ | 101 |
| 2 | 22 | 2 | ------ | ------ | 112 | 111 |
| 3 | 23 | 3 | ------ | ------ | 122 | ------ |
| 4 | 24 | 4 | ------ | 133 | 132 | ------ |
| 5 | 25 | 5 | ------ | 143 | 142 | 141 |
| (6) | (26) | 6 | ------ | (153) | ------ | (151) |
| (7) | (27) | 7 | ------ | (163) | ------ | ------ |
| (8) | (28) | 8 | (174) | (173) | ------ | ------ |
| (9) | (29) | 9 | (184) | (183) | ------ | (181) |
| (10) | (30) | 10 | (194) | (193) | (192) | (191) |
| (11) | (31) | 11 | (204) | (203) | (202) | ------ |
| (12) | (32) | 12 | (214) | ------ | (212) | ------ |
| (13) | (33) | 13 | (224) | ------ | (222) | (221) |
| 14 | 34 | 14 | 234 | ------ | ------ | 231 |
| 15 | 35 | 15 | 244 | ------ | ------ | ------ |

In the foregoing table, reference numerals assigned to cores not actually shown in FIGURE 1 have been placed in brackets. Thus core (6) would have a graded winding (26) with six times as many turns as graded winding 21 and would have output windings (151) and (153) associated with the A and C inputs of digital output register 102, winding (151) being connected in series between windings 141 and 231 in FIGURE 1, for example in the region indicated by the dash line 250 in FIGURE 1 and winding (153) being connected in series with windings 133 and 143 as indicated by dash line 251. Graded winding (26) would be in series with graded windings 21–25 and 34, 35 as indicated by dash line 252. Referring to the numbers in Table I, therefore, graded windings (26), (27), (28), (29), (30), (31), (32) and (33) would all be in series between graded windings 21–25 and 34, 35 as indicated by dash line 252 in FIGURE 1. Output windings (151), (181), (191) and (221) would all be in series with windings 101, 111, 141 and 231 and connected to the A input of the digital register as indicated by dash line 250 in FIGURE 1. Output windings (192), (202), (212) and (222) would be in series with output windings 112, 122, 123 and 142 and coupled to the B input of register 102 as indicated by dash line 253 in FIGURE 1. Output windings (153), (163), (173), (183), (193) and (203) would be in series with windings 133 and 143 and connected to the C input of register 102, and output windings (174), (184), (194), (204), (214) and (224) would all be in series with windings 234 and 244 as indicated by dash line 254 in FIGURE 1 and connected to the D input of register 102. The input windings (56), (57), (58), (59), (60), (61), (62) and (63) associated with cores (6)–(13) would be in series with windings 51–55 and 64, 65 as indicated by dash line 255 in FIGURE 1. High frequency interrogation windings (86), (87), (88), (89), (90), (91), (92) and (93) associated with cores (6)–(13), respectively, are in series with windings 81–85, 94 and 95 as indicated by dash line 256 in FIGURE 1.

The code significance of the winding arrangement illustrated in FIGURE 1 become apparent if the winding arrangement is tabulated and the presence of a winding assigned the code term "1" (one) while the absence of a winding is assigned the code designation "0" (zero):

The foregoing code system should be contrasted with the normal binary code, which is an alternative possibility, and is tabulated in Tables III and IV below and which will be readily understood by those skilled in the art by analogy with Tables I and II and the showing in FIGURE 1.

TABLE II

*Output winding code for the embodiment of FIGURE 1*

| Core No. | Code position | | | | Decimal code total |
|---|---|---|---|---|---|
| | D(15) | C(7) | B(3) | A(1) | |
| 1 | 0 | 0 | 0 | 1 | 1 |
| 2 | 0 | 0 | 1 | 1 | 3−1=2 |
| 3 | 0 | 0 | 1 | 0 | 3 |
| 4 | 0 | 1 | 1 | 0 | 7−3=4 |
| 5 | 0 | 1 | 1 | 1 | 7−3+1=5 |
| (6) | 0 | 1 | 0 | 1 | 7−1=6 |
| (7) | 0 | 1 | 0 | 0 | 7 |
| (8) | 1 | 1 | 0 | 0 | 15−7=8 |
| (9) | 1 | 1 | 0 | 1 | 15−7+1=9 |
| (10) | 1 | 1 | 1 | 1 | 15−7+3−1=10 |
| (11) | 1 | 1 | 1 | 0 | 15−7+3=11 |
| (12) | 1 | 0 | 1 | 0 | 15−3=12 |
| (13) | 1 | 0 | 1 | 1 | 15−3+1=13 |
| 14 | 1 | 0 | 0 | 1 | 15−1=14 |
| 15 | 1 | 0 | 0 | 0 | 15 |

TABLE III

*Alternative arrangement of windings for FIGURE 1 following conventional binary code*

| Core ref. No.: | Graded winding | | Output winding | | | |
|---|---|---|---|---|---|---|
| | Ref. No. | Relative number of turns | D | C | B | A |
| 1 | 21 | 1 | ------ | ------ | ------ | 101 |
| 2 | 22 | 2 | ------ | ------ | 111 | ------ |
| 3 | 23 | 3 | ------ | ------ | 122 | (121) |
| 4 | 24 | 4 | ------ | 133 | ------ | ------ |
| 5 | 25 | 5 | ------ | 143 | ------ | 141 |
| (6) | (26) | 6 | ------ | (153) | (152) | ------ |
| (7) | (27) | 7 | ------ | (163) | (162) | (161) |
| (8) | (28) | 8 | (174) | ------ | ------ | ------ |
| (9) | (29) | 9 | (184) | ------ | ------ | (181) |
| (10) | (30) | 10 | (194) | ------ | (192) | ------ |
| (11) | (31) | 11 | (204) | ------ | (202) | (201) |
| (12) | (32) | 12 | (214) | (213) | ------ | ------ |
| (13) | (33) | 13 | (224) | (223) | ------ | (221) |
| 14 | 34 | 14 | 234 | (233) | (232) | ------ |
| 15 | 35 | 15 | 244 | (243) | (242) | (241) |

TABLE IV

*Alternative output winding code for the embodiment of FIGURE 1*

| Core No. | $D(2^3)$ | $C(2^2)$ | $B(2^1)$ | $A(2^0)$ | Decimal code total |
|---|---|---|---|---|---|
| 1 | 0 | 0 | 0 | 1 | 1 |
| 2 | 0 | 0 | 1 | 0 | 2 |
| 3 | 0 | 0 | 1 | 1 | 2+1=3 |
| 4 | 0 | 1 | 0 | 0 | 4 |
| 5 | 0 | 1 | 0 | 1 | 4+1=5 |
| (6) | 0 | 1 | 1 | 0 | 4+2=6 |
| (7) | 0 | 1 | 1 | 1 | 4+2+1=7 |
| (8) | 1 | 0 | 0 | 0 | 8 |
| (9) | 1 | 0 | 0 | 1 | 8+1=9 |
| (10) | 1 | 0 | 1 | 0 | 8+2=10 |
| (11) | 1 | 0 | 1 | 1 | 8+2+1=11 |
| (12) | 1 | 1 | 0 | 0 | 8+4=12 |
| (13) | 1 | 1 | 0 | 1 | 8+4+1=13 |
| 14 | 1 | 1 | 1 | 0 | 8+4+2=14 |
| 15 | 1 | 1 | 1 | 1 | 8+4+2+1=15 |

For the conventional binary code winding arrangement, if the analog input signal is intermediate the bias values for two successive cores, and both cores are unsaturated, an error of substantial magnitude can result. For example, if the analog input signal is assigned a value of −1.5 on the scale of FIGURE 4 corresponding to point 300 on curve 67 and point 300′ on curve 67′, high frequency interrogation signal 301 from component 80 may be effectively coupled both to winding 101 and windings 111 and 112. Register 102 will then read a decimal code total of three (a one in the A position and a one in the B position) for the normal binary code arrangement of Tables III and IV. The error would then be three minus 1.5 or 1.5 units of input magnetizing force. With the winding arrangement actually shown in FIGURE 1 and tabulated in Tables I and II, with an input corresponding to point 300 in FIGURE 4, and cores 1 and 2 desaturated, digital output register 102 would sense a one in the A position and a one in the B position signifying a code total of two or an error of two minus 1.5 or one-half unit of magnetizing force with respect to the scale of FIGURE 4. Thus by utilizing the code arrangement of Table II, the possible errors in reading of the analog input signal for a given number of cores and a given graded winding pattern is markedly reduced.

The significance of the code of Table II can be summarized by stating that the simultaneous desaturation of two adjacent cores will produce a code signal corresponding to one of the two desaturated cores. Thus, referring to Table II, if cores 1 and 2 are desaturated, the signal is that of core 2, if cores 2 and 3 are desaturated, the signal is that of core 2, if cores 3 and 4 are desaturated, the signal is that of core 4; if cores 4 and 5 are desaturated, the signal corresponds to that of core 5; if cores 5 and (6) are desaturated, the signal corresponds to that of core 5; if cores (6) and (7) are desaturated, the signal corresponds to that of core (6); if cores (7) and (8) are desaturated, the signal is that of core (8); if cores (8) and (9) are desaturated, the signal is that of core (9); if cores (9) and (10) are desaturated, the signal is that of core (10); if cores (10) and (11) are desaturated, the signal is that of core (10), if cores (11) and (12) are desaturated, the signal is that of core (11); if cores (12) and (13) are desaturated, the signal is that of core (13); if cores (13) and 14 are desaturated, the signal is that of core (13); and if cores 14 and 15 are desaturated, the signal is that of core 14.

The manner in which the code of Table II may be converted into the normal binary code will be apparent to those skilled in the art and is discussed, for example, in Reference Data for Radio Engineers, fourth edition, page 882, published by International Telephone and Telegraph Corporation. Of course, many other codes could be utilized to represent the analog input signal in digital form, the basic concept being to utilize a plurality of windings on certain of the cores to correspond to a plurality of code positions in the output system.

By way of example, the digital output register 102 may comprise a collection of gaseous triodes (thyratrons) one for each input A, B, C and D to the register. The anode of each triode would be connected through a suitable current limiting resistor to a source of alternating current potential which is phase synchronous with the voltage applied to the interrogation windings 81–95 from component 80. The input signals at inputs A, B, C and D of the register 102 would be applied between the grid and cathode of the respective triodes and would include a fundamental component of the same frequency and in phase with the alternating current potential applied between the cathode and plate of each triode. Each triode would be biased by means of a direct current grid-cathode potential so that with all cores associated with a given input to the register 102 in a saturated condition, the input signal to the corresponding triode would be insufficient to cause conduction between the cathode and plate of the triode. When, however, one of the cores is desaturated, the signal amplitudes produced by the associated output windings would be sufficient to render the associated triodes conducting. The output of the conducting triodes may drive a recording device or be fed directly to a digital computer, as desired. Thus, it will be apparent that the high frequency interrogation source 80 may supply a continuous interrogation signal to the windings 81 to 95 to provide a continuously available output in digital form at the register 102 which varies in accordance with the analog input signal from component 50.

The analog input source 50 may comprise any conventional transducer device whose output may be converted to a corresponding varying current in the input windings 51–65, such as a thermocouple, strain gauge or the like.

The frequency of the signal from interrogation component 80 should be substantially greater than the frequency or rate of variation of the input signal to be converted where a substantially continuous conversion of the analog input signal is desired. Alternatively, a discrete interrogation pulse could be supplied to windings 81–95 at desired intervals to activate the converter.

It will, of course, be understood that while four code positions have been indicated, the principles of the present invention may be extended to systems of higher resolution, for example by increasing the number of cores and correspondingly increasing the number of possible output windings per core.

Figure 3:
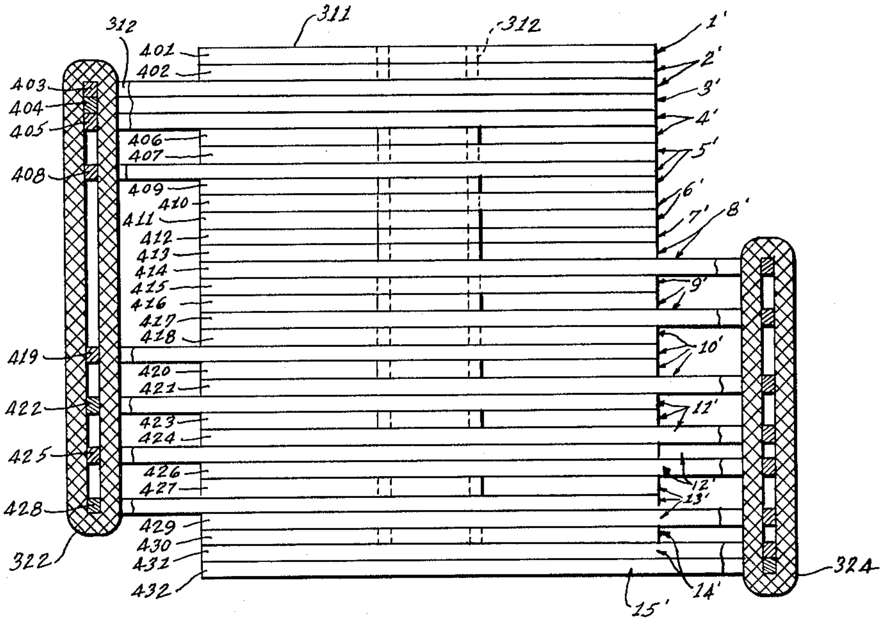
FIGURE 3 is a diagrammatic side elevational view of the stacked arrangement of cores of FIGURE 2 and showing a preferred disposition of the cores for the system of FIGURE 1.

FIGURES 2 and 3 illustrate a preferred way of forming the cores 1–15 and a preferred arrangement of the cores for a more compact overall assembly. Thus, while in FIGURE 1, cores 1–15 are shown as having reduced cross section output parts such as 310 on which the various output windings are wound, in FIGURES 2 and 3, single laminations such as indicated generally at 311 are utilized each having a single output section 312 of reduced cross section. In forming core elements receiving the respective levels of bias magnetization, one or more of the laminations 311 may be stacked together, with the associated output sections 312 at the desired angular positions in the stack. The reference numerals 1′–15′ are assigned to the successive core elements formed in this manner and corresponding to the cores 1–15 in FIGURE 1.

The embodiment of FIGURES 2 and 3 is entirely analogous to the embodiment of FIGURE 1. Thus bias supply 20 of FIGURE 1 would be connected to the graded winding 315 shown in FIGURE 2 which links the successive cores with successively different numbers of turns as in the embodiment of FIGURE 1. Lamination 401 constituting core 1′ would receive a relative number of bias turns of one, while core 2′ comprising laminations 402 and 403 would receive a relative number of bias turns of two and so on. The structure of FIGURES 2 and 3 is summarized in the following table:

TABLE V

*Converter system of Figures 2 and 3*

| Core element Ref. No. | Lamination | | Graded winding | | Output winding linking core | No. of laminations |
|---|---|---|---|---|---|---|
| | Ref. No. | Orientation | Ref. No. | Relative number of turns | | |
| 1′ | 401 | A | 315 | 1 | 321 | 1 |
| 2′ | 402<br>403 | A<br>B | 315 | 2 | 321<br>322 | 2 |
| 3′ | 404 | B | 315 | 3 | 322 | 1 |
| 4′ | 405<br>406 | B<br>C | 315 | 4 | 322<br>323 | 2 |
| 5′ | 407<br>408<br>409 | A<br>B<br>C | 315 | 5 | 321<br>322<br>323 | 3 |
| 6′ | 410<br>411 | A<br>C | 315 | 6 | 321<br>323 | 2 |
| 7′ | 412 | C | 315 | 7 | 323 | 1 |
| 8′ | 413<br>414 | C<br>D | 315 | 8 | 323<br>324 | 2 |
| 9′ | 415<br>416<br>417 | A<br>C<br>D | 315 | 9 | 321<br>323<br>324 | 3 |
| 10′ | 418<br>419<br>420<br>421 | A<br>B<br>C<br>D | 315 | 10 | 321<br>322<br>323<br>324 | 4 |
| 11′ | 422<br>423<br>424 | B<br>C<br>D | 315 | 11 | 322<br>323<br>324 | 3 |
| 12′ | 425<br>426 | B<br>D | 315 | 12 | 322<br>324 | 2 |
| 13′ | 427<br>428<br>429 | A<br>B<br>D | 315 | 13 | 321<br>322<br>324 | 3 |
| 14′ | 430<br>431 | A<br>D | 315 | 14 | 321<br>324 | 2 |
| 15′ | 432 | D | 315 | 15 | 324 | 1 |
| Total number of laminations | | | | | | 32 |

Analog input component 50 of FIGURE 1 would be connected to the common input winding 317 which would link laminations 401–432, inclusive, in FIGURE 3 in common to supply the same input magnetomotive force to each lamination as in the embodiment of FIGURE 1. The high frequency interrogation signal supply component 80 in FIGURE 1 would be connected to the common winding 318 shown in FIGURE 2 linking cores 401 through 432 in common. If required to balance the applied input magnetomotive force for each of cores 1′–15′ and the interrogation magnetization for each of core $1^1$–$15^1$, each core element receiving a given level of bias magnetization could be comprised of four laminations identical to lamination 311 in FIGURE 2, but with the reduced cross section output portions 312 of laminations which are not to be linked by output windings offset from the other winding positions, for example in positions as indicated at 450 in FIGURE 2. This would increase the total number of laminations in the embodiment of FIGURES 2 and 3 to 60, instead of the 32 laminations shown in FIGURE 3.

Output windings 321, 322, 323 and 324 would be connected to the A, B, C and D inputs of the digital output register 102 in FIGURE 1, respectively. Winding 322 is shown in vertical cross section in FIGURE 3 to illustrate the manner in which the windings may helically encircle the B oriented output sections 312 of laminations 403, 404, 405, 408, 419, 422, 425 and 428 in common. Windings 321, 323 and 324 link the respective A, C and D oriented output sections 312 of laminations 311 in the same manner as indicated for winding 322 in FIGURE 3. The embodiment of FIGURES 2 and 3 will, of course, operate in the same manner as previously described with reference to FIGURE 4, and accordingly reference is made to the description relating to FIGURES 1 and 4 for an explanation of the detailed operation of the embodiment of FIGURES 2 and 3.

It should be noted that in practice, there will be slight spaces between the successive core elements 1′–15′ to allow the graded winding 315 to link the successive core elements with successive numbers of turns. The graded winding 315 will be completely similar to the series of windings 21–35 in FIGURE 1, except that the windings will be vertically superposed in correspondence with the vertical stacking of the cores. It may be noted that it is preferable to place the interrogation winding 318 and the input winding 317 in overlying relation to the graded winding 315 so as to to facilitate a more complete neutralization of the bias magnetization and a more effective blocking of the high frequency interrogation signal in operation of the system. Thus, windings 315, 317 and 318 may actually be relatively symmetrically distributed annularly about the large cross section portions of the stacked assembly of core elements in the embodiment of FIGURES 2 and 3 as well as in the embodiment of FIGURE 1.

Figure 5:
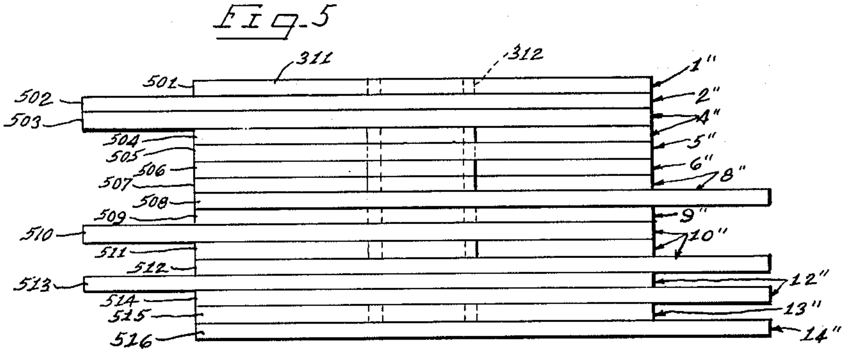
FIGURE 5 is a diagrammatic side elevational view similar to FIGURE 3 and illustrating a modified arrangement of cores wherein the current in the graded winding is reduced by a factor of two so that two core assemblies rather than one are out of saturation at any given time.

FIGURE 5 illustrates a modified converter system in accordance with the present invention wherein the current through the graded winding is reduced by a factor of two so that two elements rather than one element are out of saturation at any time. This has the dual advantage of doubling the resolution of the system to changes in input current and decreasing the number of laminations required by a factor of two.

The arrangement is summarized in the following table:

It will be understood from Table VI that core 4″, for example, comprises laminations 503 and 504 with B and C orientation, respectively, and connected to the B and C inputs of the register 102 in FIGURE 1. Core 4 in FIGURE 1 has the same orientation of output sections as core 4″ in FIGURE 5, while no lamination group is present in FIGURE 5 corresponding to core 3 in FIGURE 1. Similarly lamination groups corresponding to cores 7, 11 and 15 in FIGURE 1 have been omitted in the system of FIGURE 5.

TABLE VI

*Embodiment of Figure 5*

| Core ref. No. | Lamination | | Graded winding | | No. of laminations |
|---|---|---|---|---|---|
| | Ref. No. | Orientation | Rel. number of turns | Bias on scale of Figure 4 | |
| 1″ | 501 | A | 1 | ½ | 1 |
| 2″ | 502 | B | 2 | 1 | 1 |
| 4″ | 503<br>504 | B<br>C | 4 | 2 | 2 |
| 5″ | 505 | A | 5 | 2½ | 1 |
| 6″ | 506 | C | 6 | 3 | 1 |
| 8″ | 507<br>508 | C<br>D | 8 | 4 | 2 |
| 9″ | 509 | A | 9 | 4½ | 1 |
| 10″ | 510<br>511<br>512 | B<br>C<br>D | 10 | 5 | 3 |
| 12″ | 513<br>514 | B<br>D | 12 | 6 | 2 |
| 13″ | 515 | A | 13 | 6½ | 1 |
| 14″ | 516 | D | 14 | 7 | 1 |
| Total | | | | | 16 |

To illustrate the logical functioning of FIGURE 5, the following table is presented:

TABLE VII

*Logic for embodiment of FIGURE 5*

| Analog input—Scale of Figure 4 | Cores desaturated | Code positions | | | | Decimal code total |
|---|---|---|---|---|---|---|
| | | D(15) | C(7) | B(3) | A(1) | |
| −¼ | 1″ | 0 | 0 | 0 | 1 | 1 |
| −¾ | 1″, 2″ | 0 | 0 | 1 | 1 | 3−1=2 |
| −1¼ | 2″ | 0 | 0 | 1 | 0 | 3 |
| −1¾ | 4″ | 0 | 1 | 1 | 0 | 7−3=4 |
| −2¼ | 4″, 5″ | 0 | 1 | 1 | 1 | 7−3+1=5 |
| −2¾ | 5″, 6″ | 0 | 1 | 0 | 1 | 7−1=6 |
| −3¼ | 6″ | 0 | 1 | 0 | 0 | 7 |
| −3¾ | 8″ | 1 | 1 | 0 | 0 | 15−7=8 |
| −4¼ | 8″, 9″ | 1 | 1 | 0 | 1 | 15−7+1=9 |
| −4¾ | 9″, 10″ | 1 | 1 | 1 | 1 | 15−7+3−1=10 |
| −5¼ | 10″ | 1 | 1 | 1 | 0 | 15−7+3=11 |
| −5¾ | 12″ | 1 | 0 | 1 | 0 | 15−3=12 |
| −6¼ | 12″, 13″ | 1 | 0 | 1 | 1 | 15−3+1=13 |
| −6¾ | 13″, 14″ | 1 | 0 | 0 | 1 | 15−1=14 |
| −7¼ | 14″ | 1 | 0 | 0 | 0 | 15 |

It will be observed from Table VI that cores 1″, 2″, 4″, 6″, 8″, 9″, 10″, 12″, 13″ and 14″ are assumed to have bias magnetization of approximately ½, 1, 2, 2½, 3, 4, 4½, 5, 6, 6½ and 7 on the scale of FIGURE 4 when the bias current from bias supply 20 is reduced by a factor of two. Thus, when the analog input as represented by curve 67 in FIGURE 4 reaches a value of minus ½ in the units of FIGURE 4 the bias magnetization in core 1″ will be substantially neutralized to substantially completely desaturate core 1″. When the analog input increases to a value of 1 on the scale of FIGURE 4, the bias magnetization of core 2″ will be substantially neutralized to desaturate core 2″. If core 1″ initially receives a bias magnetization of plus ½ unit with reference to the scale of FIGURE 4 and the analog signal produces a signal magnetization of minus 1 unit, the resultant magnetization of core 1″ is minus ½ unit. In the illustrated embodiment, it is assumed that one-half unit of magnetization on the scale of FIGURE 4 is just sufficient to effectively saturate the material of the cores, but that any core in FIGURE 5 having a bias magnetization within ¼ of a unit of the input analog magnetization (but of opposite polarity) will be effectively desaturated and transmit the high frequency interrogation signal from its output windings to the digital output register such as 102 in FIGURE 1. Accordingly, when the analog input is equal to minus ¾ units on the scale of FIGURE 4, cores 1″ and 2″ will both be effectively desaturated.

The various windings associated with the core assembly of FIGURE 5 would be identical to the windings 315, 317, 318, 321, 322, 323 and 324 in FIGURE 2, and the electrical connections and operation of FIGURE 5 will be apparent from the description of FIGURES 1 through 4.

Where the system is to convert analog signals over a range including both positive and negative polarities of input current, the bias windings on the successive cores will provide a range of bias magnetomotive forces graduated from a negative maximum value through zero to a positive maximum value, the maximum bias values being determined by the respective maximum values of analog input magnetomotive force of opposite polarity to be converted.

It will be apparent that many further modifications and variations may be effected without departing from the scope of the novel concepts of the present invention.

I claim as my invention:

1. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output windings coupled with said cores with a plurality of output windings on each of a plurality of said cores and providing a different pattern of output windings coupled to each of the successive cores, said bias means providing bias magnetomotive forces in each of the cores of value to block the transmission of energy from the interrogation means to the output windings of each core unless the bias magnetomotive force in the core is opposed by a substantially equal and opposite value of input magnetomotive force in the core, and utilization means having inputs connected with the respective series of output windings to sense which of the cores is transmitting energy from the interrogation means to its output means.

2. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means coupled with said cores and providing a different pattern of output means coupled to each of the successive cores, said bias means providing bias magneomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, said cores being shiftable from a blocking condition preventing transmission of energy from the interrogation means to the output means thereof to an unblocking condition wherein energy is transmitted from the interrogation means to the output means by a net difference between the bias magnetomotive force and the input magnetomotive force not greater than one-half the difference in bias magnetomotive forces applied to the successive cores so that at least one core is always in an unblocking condition for a range of values of input magnetomotive force.

3. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means coupled with said cores and providing a different pattern of output means coupled to each of the successive cores, said bias means providing bias magnetomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, said cores being shiftable from a blocking condition preventing transmission of energy from the interrogation means to the output means thereof to an unblocking condition wherein energy is transmitted from the interrogation means to the output means by a net difference between the bias magnetomotive force and the input magnetomotive force not greater than one-half the difference in bias magnetomotive forces applied to the successive cores so that at least one core is always in an unblocking condition for a range of values of input magnetomotive force, and the arrangement of output means on the successive cores having successively higher bias magnetomotive forces applied thereto being a code such that simultaneous unblocking of two successive cores resulting from an input magnetomotive force intermediate the bias magnetomotive forces of the two cores produces a pattern of energized output means at the input of said utilization means identical to the pattern of energized output means corresponding to one of the two cores alone when in unblocking condition.

4. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means comprising output windings coupled with said cores including a plurality of output windings on each of a plurality of said cores and providing a different pattern of output means coupled to each of the successive cores, said bias means providing bias magnetomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, at least certain of the cores comprising a plurality of core units having respective offset output portions, and the output means of each series of output means associated with the respective cores being coupled to the output portions of respective different core units of said cores.

5. An analog to digital converter system comprising a series of magnetic cores bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means coupled with said cores comprising a plurality of output windings on each of a plurality of said cores and providing a different pattern of output means coupled to each of the successive cores, said bias means providing bias magnetomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, at least certain of the cores comprising a plurality of core units having respective offset output portions, and the output means of each series of output means associated with the respective cores being coupled to the output portions of respective different core units of said cores, said input means and said interrogation means comprising windings common to all of the core units of each core.

6. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means coupled with said cores and providing a different pattern of output means coupled to each of the successive cores, said bias means providing bias magnetomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, said bias means comprising a graded bias winding linking the cores with successively different numbers of turns.

7. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means coupled with said cores and providing a different pattern of output means coupled to each of the successive cores, said bias means providing bias magnetomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, at least certain of the cores comprising a plurality of core units having respective offset output portions, and the output means of each series of output means associated with the respective cores being coupled to the output portions of respective different core units of said cores, said output portions of said core units being of reduced cross section as compared to other portions of the core units and projecting outwardly from adjacent portions of the core units, and the output means comprising output windings linking the output portions of the core units.

8. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means coupled with said cores and providing a different pattern of output means coupled to each of the successive cores, said bias means providing bias magnetomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, at least certain of the cores comprising a plurality of core units having respective offset output portions, and the output means of each series of output means associated with the respective cores being coupled to the output portions of respective different core units of said cores, the core units comprising flat laminations which are stacked to define the respective cores, the output portions of the respective core units of each core projecting laterally at different positions about the perimeter of the core.

9. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means coupled with said cores and providing a different pattern of output means coupled to each of the successive cores, said bias means providing bias magnetomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, at least certain of the cores comprising a plurality of core units having respective offset output portions, and the output means of each series of output means associated with the respective cores being coupled to the output portions of respective different core units of said cores, the core units comprising flat laminations which are stacked to define the respective cores, the output portions of the respective core units of each core projecting laterally at different positions about the perimeter of the core, and the output portions of the core units of the cores linked by each series of output means being in substantially aligned relationship.

10. An analog to digital converter system comprising a series of magnetic cores, bias means coupled to said cores for applying bias magnetomotive forces to the respective cores of respective different values, analog input means for applying an input magnetomotive force to each of the cores of polarity to oppose the bias magnetomotive forces of at least certain of said cores, interrogation means for applying an interrogation magnetomotive force to each of said cores, a plurality of series of output means coupled with said cores and providing a different pattern of output means coupled to each of the successive cores, said bias means providing bias magnetomotive forces in each of the cores of value to block the transmission of energy from the interrogation means to the output means of each core unless the bias magnetomotive force in the core is opposed by a substantially equal and opposite value of input magnetomotive force in the core, and utilization means having inputs connected with the respective series of output means to sense which of the cores is transmitting energy from the interrogation means to its output means, said cores being shiftable from a blocking condition preventing transmission of energy from the interrogation means to the output means thereof to an unblocking condition wherein energy is transmitted from the interrogation means to the output means by a net difference between the bias magnetomotive force and the input magnetomotive force not greater than one-half the difference in bias magnetomotive forces applied to the successive cores so that at least one core is always in an unblocking condition for a range of values of input magnetomotive force, the increment in bias magnetomotive force between at least certain of said cores being such that both cores will be in an unblocking condition for all values of input magnetomotive force intermediate the values of bias magnetomotive force applied to the cores.

References Cited by the Examiner

UNITED STATES PATENTS

| | | | |
|---|---|---|---|
| 2,430,457 | 11/1947 | Diamond | 235—92 |
| 2,465,798 | 3/1949 | Granfield | 336—234 |
| 2,469,100 | 5/1949 | Andrus | 336—234 |
| 2,947,971 | 8/1960 | Glauberman | 340—347 |
| 3,030,618 | 4/1962 | Nilsson | 340—347 |
| 3,123,817 | 3/1964 | Golden | 340—347 |
| 3,127,600 | 3/1964 | Kaenel | 340—347 |
| 3,132,335 | 5/1964 | Kahn | 340—347 |

MALCOLM A. MORRISON, *Primary Examiner.*

IRVING L. SRAGOW, *Examiner.*